Figure 1:
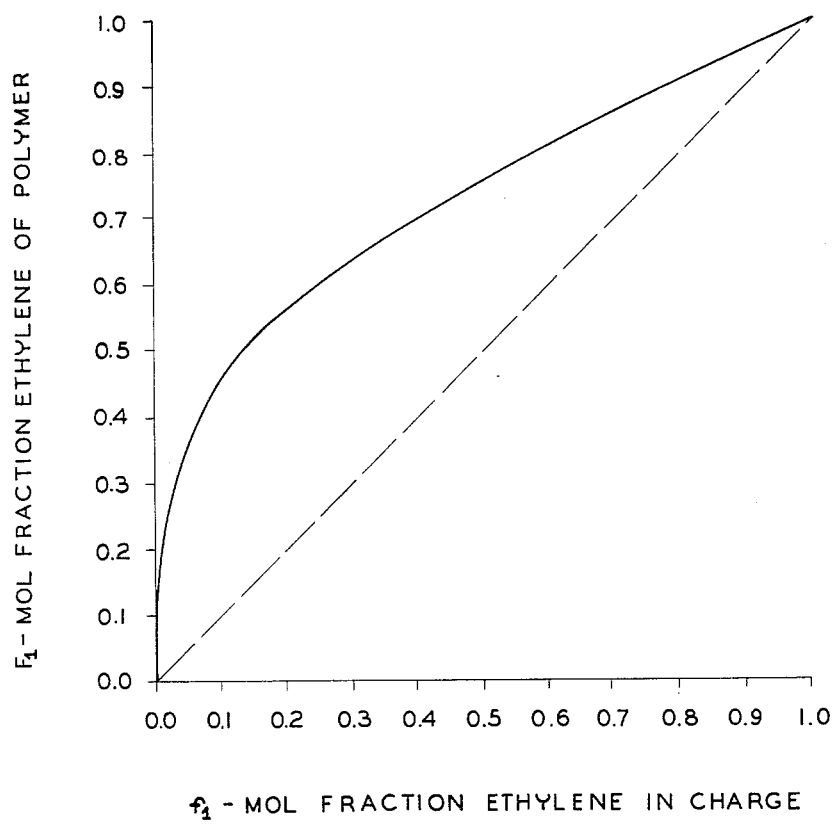

POLYMER VS MONOMER COMPOSITION FOR ETHYLENE/VINYLOXYETHANOL COPOLYMERIZATION AT 30,000 p.s.i.

PRESSURE VS TEMPERATURE FOR HOMOGENEOUS ETHYLENE / VINYLOXYETHANOL POLYMERIZATION

United States Patent Office 3,252,952
Patented May 24, 1966

3,252,952
PROCESS FOR PREPARING UNIFORM POLYMERS
Oliver de S. Deex, St. Louis, Mo., assignor to Monsanto Company, a corporation of Delaware
Filed Nov. 2, 1961, Ser. No. 149,565
4 Claims. (Cl. 260—88.1)

The present invention is directed to a polymerization process for obtaining substantially uniform ethylene/vinyloxyethanol copolymer by a procedure which maintains relatively constant ratios of ethylene and vinyloxyethanol during the polymerization. The invention is particularly directed to ethylene/vinyloxyethanol copolymerization procedures in which the pressure is maintained constant by addition of ethylene and the temperature and pressure are such that such addition of ethylene maintains the monomers in relatively constant ratio.

Ordinary polymerization procedures do not generally produce uniform ethylene/vinyloxyethanol copolymer. From the fact that the ethylene/vinyloxyethanol copolymer composition differs from the feed composition which produces it, it is determined that ethylene and vinyloxyethanol do not enter the copolymer at the same rate. For example, 30% by weight vinyloxyetanol in the feed produces a copolymer having about 16% by weight vinyloxyethanol. This difference in reactivity leads to copolymer of compositional heterogeneity, particularly with increasing conversion of a particular monomer mixture to copolymer. Since the ethylene enters the copolymer faster than vinyloxyethanol, the monomer mixture becomes richer in vinyloxyethanol as the conversion progresses. This leads to a copolymer richer in vinyloxyethanol and the final product consists of a mixture of materials of increasing vinyloxyethanol content. A further complicating factor is the chain transfer effect of vinyloxyethanol. The chain transfer effect increases with increasing vinyloxyethanol concentration. Therefore ordinary ethylene/vinyloxyethanol polymerization procedures produce a copolymer exhibiting a broad molecular weight distribution, as well as compositional heterogeneity.

In the present invention a relatively uniform ethylene/vinyloxyethanol copolymer is achieved by adding the amount of faster reacting monomer, ethylene, which is required to keep the monomer ratio constant as copolymer is formed in the reaction vessel. The required amount of ethylene can be calculated from the reactivities of the monomers, or determined from a low conversion run at the desired composition. The required amount of ethylene is then added by providing sufficient ethylene to maintain the polymerization pressure, under conditions such that the volume of the required ethylene at the polymerization pressure is equal to the volume loss on polymerization.

The reactivity ratios ($r_1 r_2$ values) were determined by a classical method (Mayo, F. R., and Walling, C., Chem. Reves., vol. 46, page 191 (1950)), using a series of low conversion bomb runs at 30,000 p.s.i. The $r$ values for ethylene (monomer 1) and 2-vinyloxyethanol (monomer 2) at 30,000 p.s.i. and 120° C. were found to be:

$$r_1 = 2.1 \pm 0.05$$
$$r_2 = 0.05 \pm 0.02$$

and thus $r_1 r_2 = 0.1$; $r_1$ is defined as the ratio of the rate at which ethylene homopolymerizes to that at which it copolymerizes with vinyloxyethanol, and $r_2$ is defined as the ratio of the rate at which vinyloxyethanol homopolymerizes to that at which it copolymerizes with ethylene. As previously noted, the low reactivity of vinyloxyethanol indicates that ordinarily it enters the copolymer less rapidly than ethylene. Ordinarily the $r$ values do not vary appreciably with temperature.

As stated above, the maintenance of constant ethylene pressure will provide the proper amount of ethylene to maintain a constant monomer ratio, if the conditions and reactivities are such that the amount of ethylene which must be added to maintain such ratio is equal to the change in polymerization volume times the density of ethylene at the polymerization pressure:

$$X_A = d_A V$$

where:

$X_A$ = weight of ethylene which must be added per unit of monomer feed polymerized, to maintain a constant weight ratio of ethylene to vinyloxyethanol
$d_A$ = density of ethylene at the polymerization pressure
$V$ = volume change (loss) per unit of monomer feed polymerized.

If $X_A$ is substantially greater or less than $d_A V$ under the polymerization conditions, then uniform copolymer compositions cannot be produced by simple maintenance of constant ethylene pressure. For a given feed composition, $X_A$ is determined:

$$X_A = \frac{M_B - m_B}{M_B} = \frac{m_A - M_A}{1 - M_A}$$

where:

$M_B$ = weight fraction of vinyloxyethanol in feed
$m_B$ = weight fraction of vinyloxyethanol in copolymer
$M_A$ = weight fraction of ethylene in feed
$m_A$ = weight fraction of ethylene in copolymer The volume change, V, per unit of monomer feed polymerized is given by:

$$V = m_A/d_A + m_B/d_B - 1/\text{beta}$$

where:

$d_A$ = density of ethylene (at reaction conditions)
$d_B$ = density of vinyloxyethanol (at reaction conditions)
Beta = density of copolymer (at reaction conditions)

The invention is illustrated by the following example.

*Example*

A reaction vessel is heated to 120° C. and charged with a mixture of 70 parts ethylene and 30 parts 2-vinyloxyethanol, the parts being by weight, plus a small amount of peroxide initiator, e.g., 0.1–0.2 mol percent ditertiary-butyl peroxide based on the monomers. The reactor is pressured to 10,000 p.s.i. and maintained at this gauge pressure with pure ethylene from a pump controlled by an automatic pressure switch. After twelve hours the conversion to copolymer was 45% (based on 2-vinyloxyethanol). The copolymer contains 16 parts of combined 2-vinyloxyethanol. Identical runs stopped at lower conversions after 1, 4 or 6 hours give the same copolymer composition, demonstrating that uniform copolymer is obtained. In this successful procedure, $X_A$ equalled $d_A V$, since with $M_B = 0.30$, and $m_B = 0.16$, $$X_A = 0.47$$

and with $d_A = 0.43$, $d_B = 0.98$, beta $= 0.97$, $$V = 1.08$$

and $$d_A V = (1.08)(0.43) = 0.47$$

Thus:

$$X_A = d_A V$$

It is thus indicated that those skilled in the art can by following the disclosure herein determine for any given feed composition and reaction temperature, the reaction pressure which must be employed if maintenance of the ethylene pressure is to maintain a constant monomer ratio; or conversely, the temperature which must be employed for a given pressure.

As a further illustration and aid in selecting conditions, the graph of FIGURE 1 is provided. The graph plots the mol fraction of ethylene in the polymer against that in the charge. The weight of vinyloxyethanol in the polymer ($m_B$) can readily be calculated from the graph, making it possible to calculate the amount of ethylene ($X_A$) to be added for a given charge composition.

Figure 2:
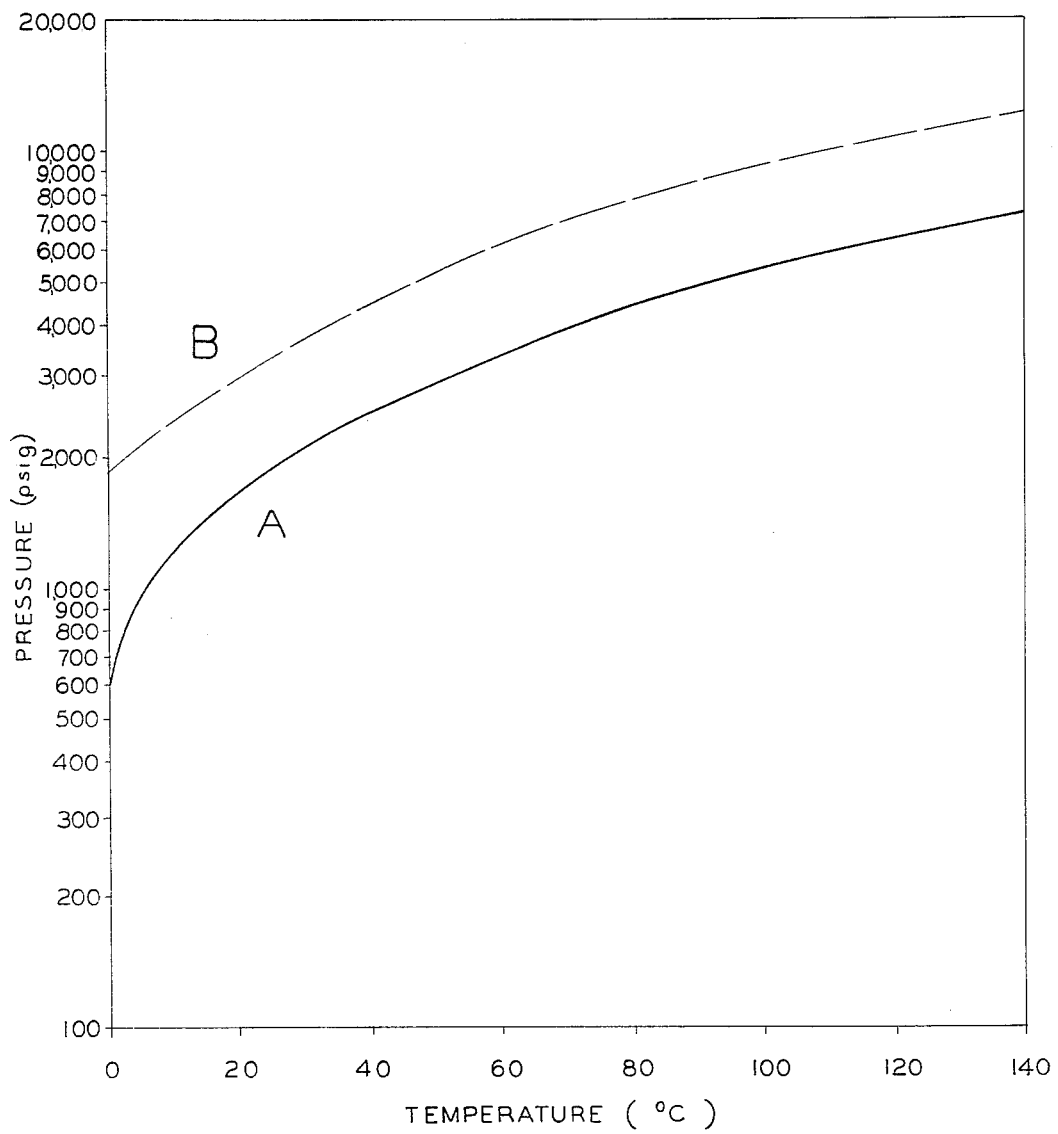

FIGURE 2 is a graph illustrating approximate pressure and temperature conditions for effecting the present invention with particular feed compositions. Curve A shows the temperature and pressure to be employed with a charge of 60 weight parts ethylene and 40 weight parts vinyloxyethanol and maintenance of constant ethylene pressure to produce a uniform copolymer of 80 parts ethylene and 20 parts vinyloxyethanol. Curve B similarly shows the values for a charge of 80 parts ethylene, and 20 parts vinyloxyethanol to produce a uniform copolymer of 90 parts ethylene and 10 parts vinyloxyethanol. It will be recognized that compositions intermediate to those illustrated would fall on a family of curves between an approximately paralleling curves A and B. Some variation from the values falling on the curves will be permissible, depending on how much the variation under the particular conditions causes the charge composition to vary, and how much non-uniformity can be tolerated in the ethylene/vinyloxyethanol product for contemplated uses. For the most part it will be desirable that the pressure not vary by more than 30% from that determined by the applicable curve of the type illustrated in FIGURE 2, and it is preferable to keep this variation within 10%. The compositions illustrated by curves A and B, and compositions intermediate thereto, are frequently of most interest, and the pressure and temperature values for these compositions generally do not depart very substantially from the area bounded by curves A and B. As temperatures of the order of 70° to 120° C. are ordinarily most suitable, the constant ethylene pressure employed is usually of the order of 3000 to 10,000 p.s.i.

It will be understood that the foregoing example and figures are illustrative and that the present invention includes any ethylene/vinyloxyethanol polmerization procedures in which ethylene is supplied at a rate to keep a constant monomer ratio, particularly by maintaining a constant ethylene pressure under conditions such that the amount of ethylene thus provided is equal to that required to maintain a constant monomer ratio, viz. by maintaining a constant ethylene pressure under conditions such that $d_A V = X_A$. It will be understood that the present invention contemplates incremental as well as continuous addition of ethylene to maintain pressure as the incremental addition may be more convenient with some types of apparatus; provided that the pressure is maintained substantially constant. In general the pressures should not vary by more than 30% from those required to have $d_A V = X_A$, and it is preferred that the pressures not vary by more than 10% from such values.

It will be recognized that the present invention is most useful in polymerizations carried to relatively high conversions, e.g. generally higher than 20% and often higher than 40 or 50%, based on the vinyloxyethanol. Conversely, when high conversions are desired it will be necessary to adhere more closely to conditions required to maintain a constant monomer ratio in order to obtain a uniform product. It will be recognized that since vinyloxyethanol is the slower polymerizing monomer, a 50% conversion of the vinyloxyethanol will often be equivalent to a 100% conversion of the original monomer charge weight, or about a 66⅔% conversion of the total monomer charge weight, depending upon the monomer ratio in the original charge.

The catalysts employed in the present process are in general free radical catalysts viz. those suitable for the high pressure, free-radical catalyzed polymerization of ethylene. In general, ethylene polymerization catalysts, including oxygen are suitable. Among the preferred catalysts are the peroxide catalysts and the azo catalysts. Among the peroxide type catalysts are for example ditolyl peroxide, benzoyl peroxide, diacetone peroxide, succinyl peroxide, acetyl peroxide, acetylbenzoyl peroxide, meta-bromobenzoyl peroxide, lauroyl peroxide, 2,2-bis-t-butyl-peroxy-butane hydrogen peroxide, zinc peroxide, peracetic acid, alkali metal persulfates, perborates and percarbonates, ammonium persulfate, perborate and percarbonate and in general all those peroxide compounds which are either formed by the action of hydrogen peroxide on ordinary acids or else which give rise to hydrogen peroxide on treatment with dilute sulfuric acid. These materials are peroxy compounds as defined in Webster's International Dictionary (1935), 2nd edition (page 3 of Patent 2,396,920 and column 3, of Patent 2,748,170). As examples of suitable azo catalyst may be mentioned bis-benzene diazo-succinate, the inorganic acid salts of 2,2'-di-guanyl-2,2'-azopropane, 2,2'-azobis(methylisobutyrate) or 2,2'-azo-bis(isobutyramide). Particularly suitable catalyst are the non-acidic catalyst, for example, ditertiarybutyl peroxide, hydroxyheptyl peroxide, dicumyl peroxide, and dialkyl peroxides in general, as set forth in my copending application Ser. No. 149,501, filed of even date herewith, and the polymerization conditions in general described in the said copending application are suitable for use in conjunction with the present invention.

The process of the present invention is generally applicable to polymerizations of any proportions of ethylene and vinyloxyethanol, although more than 50% by weight vinyloxyethanol in the monomer feed will not usually be employed, and copolymer containing 10 to 30 weight percent vinyloxyethanol, or more narrowly, 10 to 20 weight percent vinyloxyethanol, are of most interest. The present process will in general produce copolymers of relatively low or moderate molecular weights. Polymerization pressures have an effect on the molecular weight of ethylene/vinyloxyethanol copolymer pressures in the range of 3000 to 15,000 p.s.i., ordinarily producing low molecular weight waxes, melting in the range of 75 to 120° C. As such waxes are of especial interest in emulsion and wax coating applications requiring copolymer of relatively uniform composition and properties, the present invention is particularly suitable for preparing such waxes. Moreover, the pressures which result in low molecular weight waxes can suitably be employed in combination with polymerization temperatures and other polymerization conditions to permit control of the monomer feed ratios by maintenance of constant ethylene pressure according to the present invention.

The present invention provides a convenient method of controlling an ethylene/vinyloxyethanol copolymerization to obtain a copolymer of relatively uniform composition.

What is claimed is:

1. The process of preparing ethylene/vinyloxyethanol copolymer which comprises contacting approximately 60 parts by weight ethylene and 40 parts by weight vinyloxyethanol with a peroxide catalyst at temperatures and pressures not differing substantially from those of curve A of FIGURE 2 and adding ethylene to maintain pressure until at least 50% of the vinyloxyethanol is converted to copolymer.

2. The process of preparing ethylene/vinyloxyethanol copolymer which comprises contacting approximately 80 parts by weight ethylene and 20 parts by weight vinyloxyethanol with a peroxide catalyst at temperatures and pressures not differing substantially from those of curve B of FIGURE 2 and adding ethylene to maintain pressure while at least 50% of the vinyloxyethanol is converted to copolymer.

3. The process of preparing relatively uniform ethylene/vinyloxyethanol copolymer of moderate molecular weight which comprises contacting 60 to 80 parts by weight ethylene and 20 to 40 parts vinyloxyethanol with a peroxide catalyst at 70 to 120° C. and pressures of 3000 to 10,000 p.s.i., the temperature and pressure not differing by more than 30% from the curve applicable to the specific ethylene to vinyloxyethanol ratio employed, the curve being in the family of curves bounded by and approximately paralleling curves A and B of FIGURE 2, and adding ethylene to maintain constant pressure as the polymerization is continued to a greater than 20% conversion based on vinyloxyethanol.

4. The process of claim 3 in which the catalyst is a dialkyl peroxide.

References Cited by the Examiner

UNITED STATES PATENTS

| | | | |
|---|---|---|---|
| 2,414,311 | 1/1947 | Larson | 260—88.1 |
| 2,526,773 | 10/1950 | Richards et al. | 260—88.1 |
| 2,769,804 | 11/1956 | Hanson | 260—95 |
| 3,025,267 | 3/1962 | Calfee | 260—88.1 |
| 3,025,269 | 3/1962 | Calfee | 260—88.1 |

OTHER REFERENCES

Billmeyer: Textbook of Polymer Science, Interscience Publishers, Inc., New York (1957), p. 239 relied on.

JOSEPH L. SCHOFER, *Primary Examiner.*

N. G. TORCHIN, *Examiner.*